(12) United States Patent
Cheng (10) Patent No.: US 7,447,897 B2
(45) Date of Patent: Nov. 4, 2008

(54) METHOD FOR BOOTING UP EMBEDDED SYSTEM

(75) Inventor: Ming-Chieh Cheng, Shenzhen (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 334 days.

(21) Appl. No.: 11/308,058

(22) Filed: Mar. 4, 2006

(65) Prior Publication Data
US 2006/0271777 A1     Nov. 30, 2006

(51) Int. Cl.
*G06F 9/24* (2006.01)
*G06F 15/177* (2006.01)
(52) U.S. Cl. .................... 713/2; 713/1; 713/100
(58) Field of Classification Search .......... 713/1, 713/2, 100
See application file for complete search history.

(56) References Cited

U.S. PATENT DOCUMENTS 6,141,756 A * 10/2000 Bright et al. ............ 726/22
6,178,503 B1 * 1/2001 Madden et al. .......... 713/2
2004/0049669 A1 * 3/2004 Schelling et al. ........ 713/2
2005/0132179 A1 * 6/2005 Glaum et al. ............ 713/1
2006/0085631 A1 * 4/2006 Young et al. ............ 713/2

FOREIGN PATENT DOCUMENTS

CN     03153905     2/2005

* cited by examiner

*Primary Examiner*—Dennis M Butler
(74) *Attorney, Agent, or Firm*—Wei Te Chung (57) ABSTRACT

A method for booting up an embedded system that can be booted up in a normal booting up mode or an exterior driver booting up mode. The method includes steps of powering up the embedded system and detecting whether there is an exterior driver. If there is an exterior driver, then it is determined whether there is a booting up module in the exterior driver. If there is a booting up module, then it is determined whether there is a chip setting sub-module in the exterior driver. If there is a chip setting sub-module in the exterior driver, then booting up images are displayed.

18 Claims, 8 Drawing Sheets

METHOD FOR BOOTING UP EMBEDDED SYSTEM

FIELD OF THE INVENTION

The present invention relates to methods for booting up embedded electronic systems, and in particular to a method for booting up an embedded system applied in a consumer electronic product.

DESCRIPTION OF RELATED ART

Nowadays, most consumer electronic products (such as portable media devices, home media servers, or set-top-boxes) are using system-on-chips (SoCs), advanced reduced instruction set computing machines (ARMs), or microprocessor without interlocked piped stages (MIPS) central processing units (CPUs). With the growing, diverse demands from consumers for better performing electronic products, especially home electronic products, X86 CPUs that were originally employed in open systems (such as computers or servers) are becoming popular in consumer electronic products having embedded systems.

Usually, an embedded system is booted up by a system booting up setting module. For example, an embedded system using an ARM or a MIPS CPU is booted up by a boot loader, and an embedded system using an X86 CPU is booted up by a basic input output system (BIOS). In some circumstances, unauthorized users can replace the system booting up setting module with an exterior driver, and thereby enter the embedded system to illegally obtain important information such as booting up information and parameter setting information. Thus the embedded system is insecure.

Therefore, it is desired to provide a more secure method for booting up an embedded system.

SUMMARY OF INVENTION

An exemplary aspect of the present invention provides a method for booting up an embedded system that can be booted up in a normal booting up mode or an exterior driver booting up mode. The method includes steps of powering up the embedded system and detecting whether there is an exterior driver. If there is an exterior driver, then it is determined whether there is a booting up module in the exterior driver. If there is a booting up module, then it is determined whether there is a chip setting sub-module in the exterior driver. If there is a chip setting sub-module in the exterior driver, then booting up images are displayed.

Another exemplary aspect of the present invention provides another method for booting up an embedded system that can be booted up in a normal booting up mode or an exterior driver booting up mode. The method includes steps of receiving a password and determining whether the password is right. If the password is right, then it is detected whether there is an exterior driver. If there is an exterior driver, then it is determined whether there is a chip setting sub-module. If there is a chip setting sub-module, then debug images are shown.

Other advantages and novel features will be drawn from the following detailed description with the attached drawings, in which:

DETAILED DESCRIPTION

In the present invention, embedded systems can be booted up in a normal booting up mode or an exterior driver booting up mode. The embedded systems use advanced reduced instruction set computing machines (ARMs), microprocessors without interlocked piped stages (MIPS) central processing units (CPUs), or X86 CPUs.

Figure 1A:
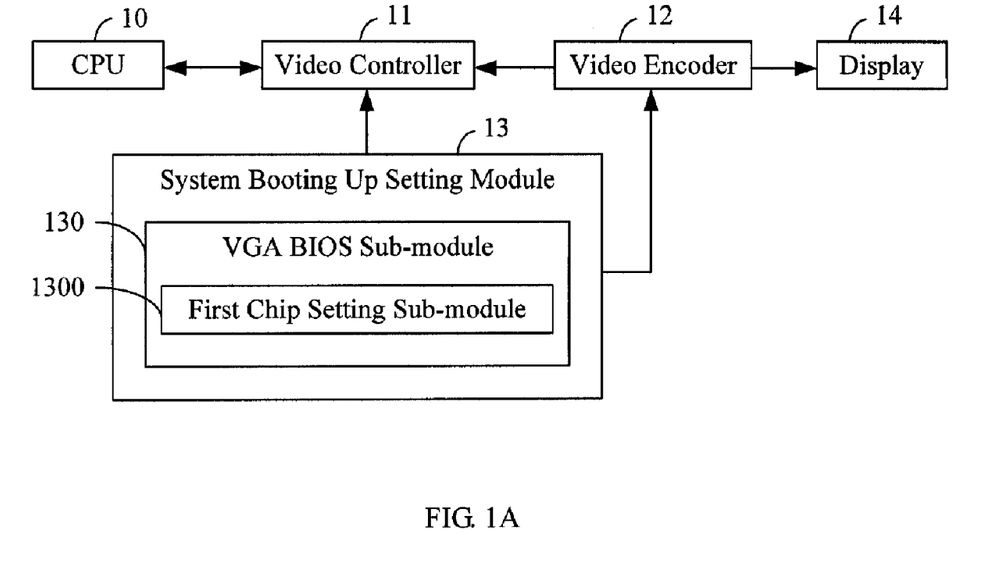
FIG. 1A is a block diagram of an embedded system in accordance with a first exemplary embodiment of the present invention.

FIG. 1A is a block diagram of an embedded system in accordance with a first exemplary embodiment of the present invention. In the exemplary embodiment, the embedded system uses an X86 CPU and works in the normal booting up mode. The embedded system includes a CPU 10, a video controller 11, a video encoder 12, a system booting up setting module 13, and a display 14. In the exemplary embodiment, the system booting up setting module 13 is a basic input output system (BIOS). The system booting up setting module 13 is connected to the video controller 11, and includes a video graphics array (VGA) BIOS sub-module 130. The VGA BIOS sub-module 130 includes a first chip setting sub-module 1300 that is previously written into a memory of the embedded system. In alternative embodiments, the first chip setting sub-module 1300 can be configured outside of the VGA BIOS sub-module 130.

In the exemplary embodiment, the video controller 11 is connected to the CPU 10 for controlling the embedded system of the invention to show different mode images, and the video controller 11 can work in two modes: a first mode and a second mode.

When the embedded system is powered up, it can enter into different display modes, for example a 640×480×256 display mode that is defined as a first display mode, or a 640×400×16 display mode that is defined as a second display mode. In the exemplary embodiment, the first display mode is a preset display mode of the embedded system in the normal booting up mode; that is, the display 14 shows 640×480×256 booting up images in the normal booting up mode.

If the video controller 11 is in the first mode, and the embedded system needs to show booting up images, the system booting up setting module 13 instructs the VGA BIOS sub-module 130 to set a work mode of the video controller 11, such as a display mode, a work frequency, and time information. Simultaneously, the VGA BIOS sub-module 130 instructs the first chip setting sub-module 1300 to set a work mode of the video encoder 12. The video encoder 12 is connected to the video controller 11, and converts digital signals received from the video controller 11 to analog signals that are suitable for the display 14, such as a TV set. In order to show booting up images on the display 14, the work mode of the video encoder 12 must be the same as that of the video controller 11.

If the video controller 11 is in the second mode, the work mode of the video controller 11 is set by the video encoder 12, rather than by the VGA BIOS sub-module 130. That is, when the embedded system needs to show the booting up images, the system booting up module 13 instructs the first chip setting sub-module 1300 to set a work mode of the video encoder 12. Then, the video encoder 12 informs the video controller 11 of its work mode. Thus, the video controller 11 can output signals that match the work mode of the video encoder 12. Therefore, the display 14 shows the booting up images.

Figure 1B:
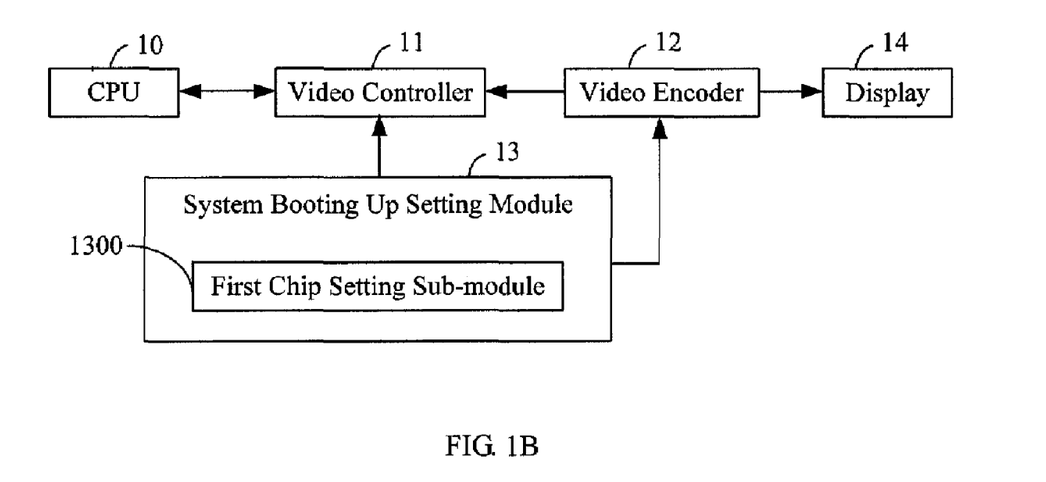
FIG. 1B is a block diagram of an embedded system in accordance with a second exemplary embodiment of the present invention.

FIG. 1B is a block diagram of an embedded system in accordance with a second exemplary embodiment of the present invention. In this embodiment, the embedded system uses an ARM or a MIPS CPU and works in the normal booting up mode. The embedded system of FIG. 1B is substantially the same as that of FIG. 1A, except that the system booting up setting module 13 of FIG. 1B does not include a VGA BIOS sub-module 130. Instead, the first chip setting sub-module 1300 is directly configured in the system booting up setting module 13. In addition, the video controller 11 of the embedded system shown in FIG. 1B only works in the second mode. In this embodiment, the system booting up setting module 13 is a boot loader.

Figure 2A:
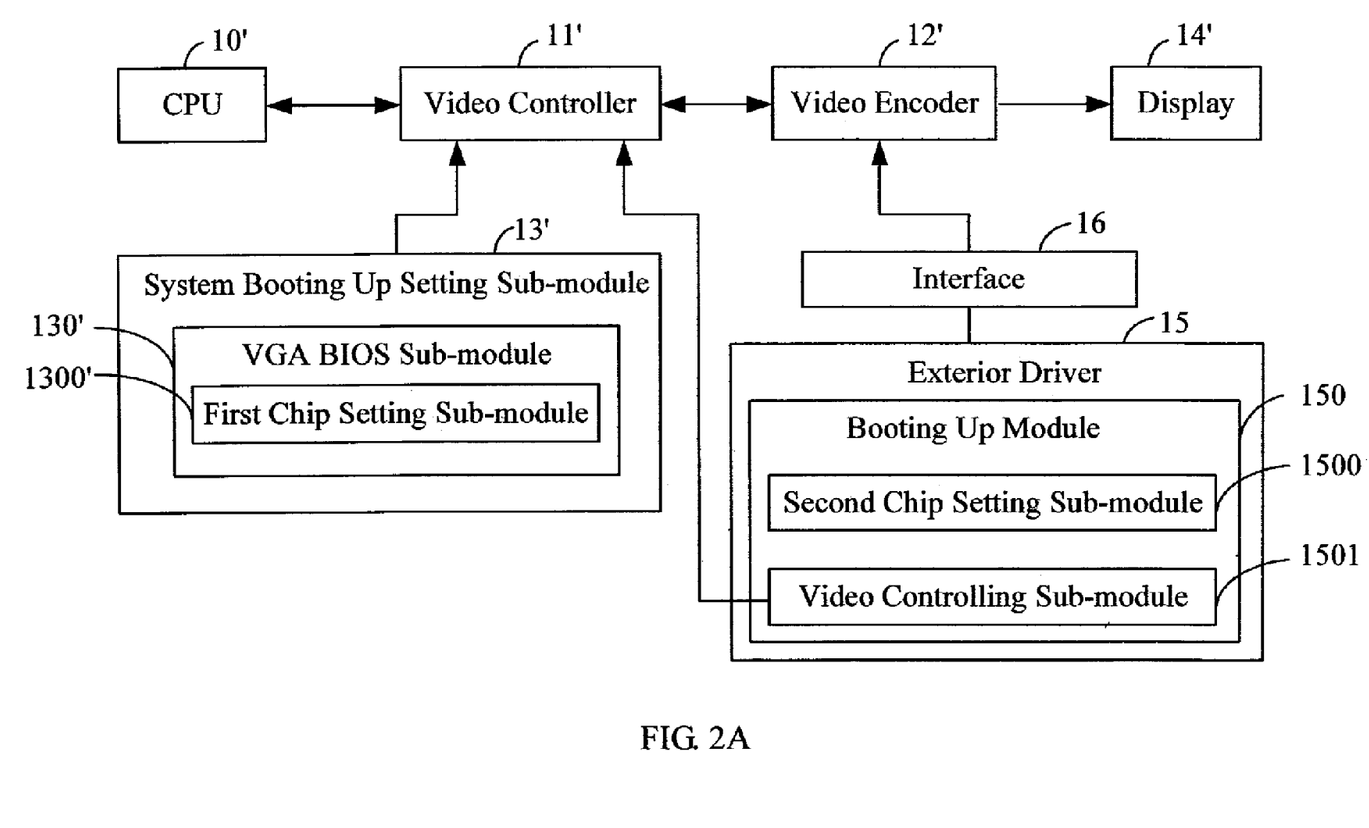
FIG. 2A is a block diagram of an embedded system in accordance with a third exemplary embodiment of the present invention.

FIG. 2A is a block diagram of an embedded system in accordance with a third exemplary embodiment of the present invention. In this embodiment, the embedded system uses an X86 CPU and works in the exterior driver booting up mode. The embedded system includes a CPU 10', a video controller 11', a video encoder 12', a system booting up setting module 13', a display 14', and an exterior driver 15. In this embodiment, the exterior driver 15 is connected to the video encoder 12' via an interface 16. The interface 16 may be a universal serial bus (USB) interface or an integrated drive electronics (IDE) interface. The system booting up setting module 13' is connected to the video controller 11', and includes a VGA BIOS sub-module 130'. The VGA BIOS sub-module 130' includes a first chip setting sub-module 1300'. In alternative embodiments, the first chip setting sub-module 1300' can be configured outside of the VGA BIOS 130'. The exterior driver 15 includes a booting up module 150, which in turn includes a second chip setting sub-module 1500 and a video controlling sub-module 1501.

If the exterior driver 15 is detected in the embedded system by the system booting up setting module 13', the embedded system works in an exterior driver booting up mode. If the exterior driver 15 is not detected in the embedded system by the system booting up setting module 13', the embedded system works in the normal booting up mode. In this embodiment, the system booting up setting module 13' is a BIOS.

If the embedded system works in the exterior driver booting up mode, the video controller 11' still works in the first mode or second mode. In this embodiment, the embedded system works in the second display mode; that is, the display 14' shows 640×400×16 booting up images in the exterior driver booting up mode. When the embedded system needs to show booting up images, the VGA BIOS sub-module 130' sets a work mode of the video controller 11', such as a display mode, and then instructs the video controlling sub-module 1501 to set a work frequency of the video controller 11'. In the exterior driver booting up mode, the work mode of the video encoder 12' is set by the second chip setting sub-module 1500, rather than by the first chip setting sub-module 1300'.

In the exterior driver booting up mode, the system booting up setting module 13' also determines whether there is a booting up module 150 in the exterior driver 15. If there is no booting up module 150 in the exterior driver 15, the embedded system works in the normal booting up mode. If there is a booting up module 150 in the exterior driver 15, the system booting up setting module 13' determines whether there is a second chip setting sub-module 1500. If there is a second chip setting sub-module 1500, the system booting up setting module 13' instructs the second chip setting sub-module 1500 to set the work mode of the video encoder 12'. Thus, the work mode of the video encoder 12' can be set correctly, and the display 14' shows the booting up images and the embedded system is booted up. If there is no second chip setting sub-module 1500, the work mode of the video encoder 12' is not set correctly. Thus the display 14' does not show the booting up images and the embedded system is not booted up.

Figure 2B:
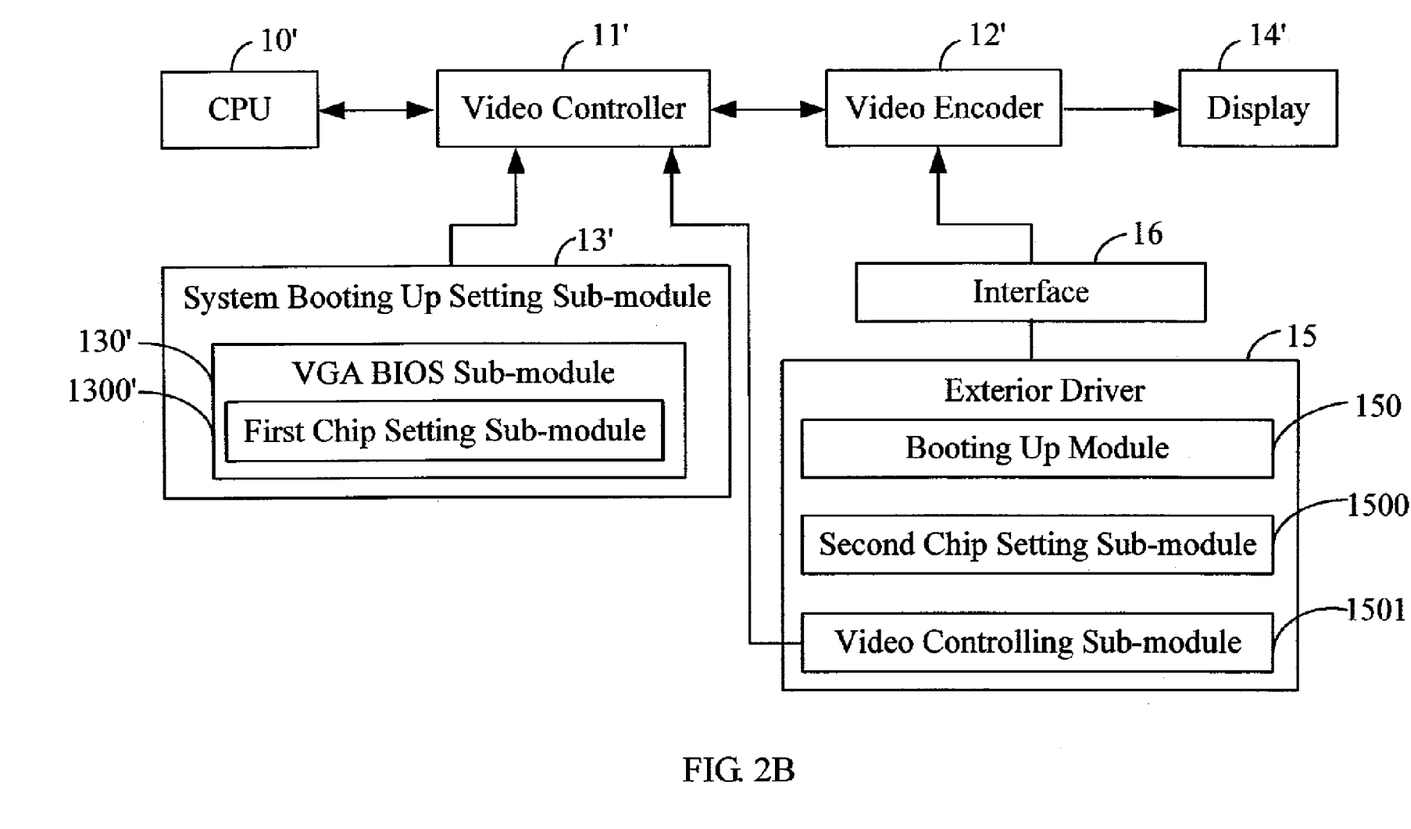
FIG. 2B is a block diagram of an embedded system in accordance with a fourth exemplary embodiment of the present invention.

FIG. 2B is a block diagram of an embedded system in accordance with a fourth exemplary embodiment of the present invention. In this embodiment, the embedded system uses an X86 CPU and works in the exterior driver booting up mode. The embedded system of FIG. 2B is substantially the same as that of FIG. 2A, except that both the second chip setting sub-module 1500 and the video controlling sub-module 1501 are configured outside of the booting up module 150.

Figure 2C:
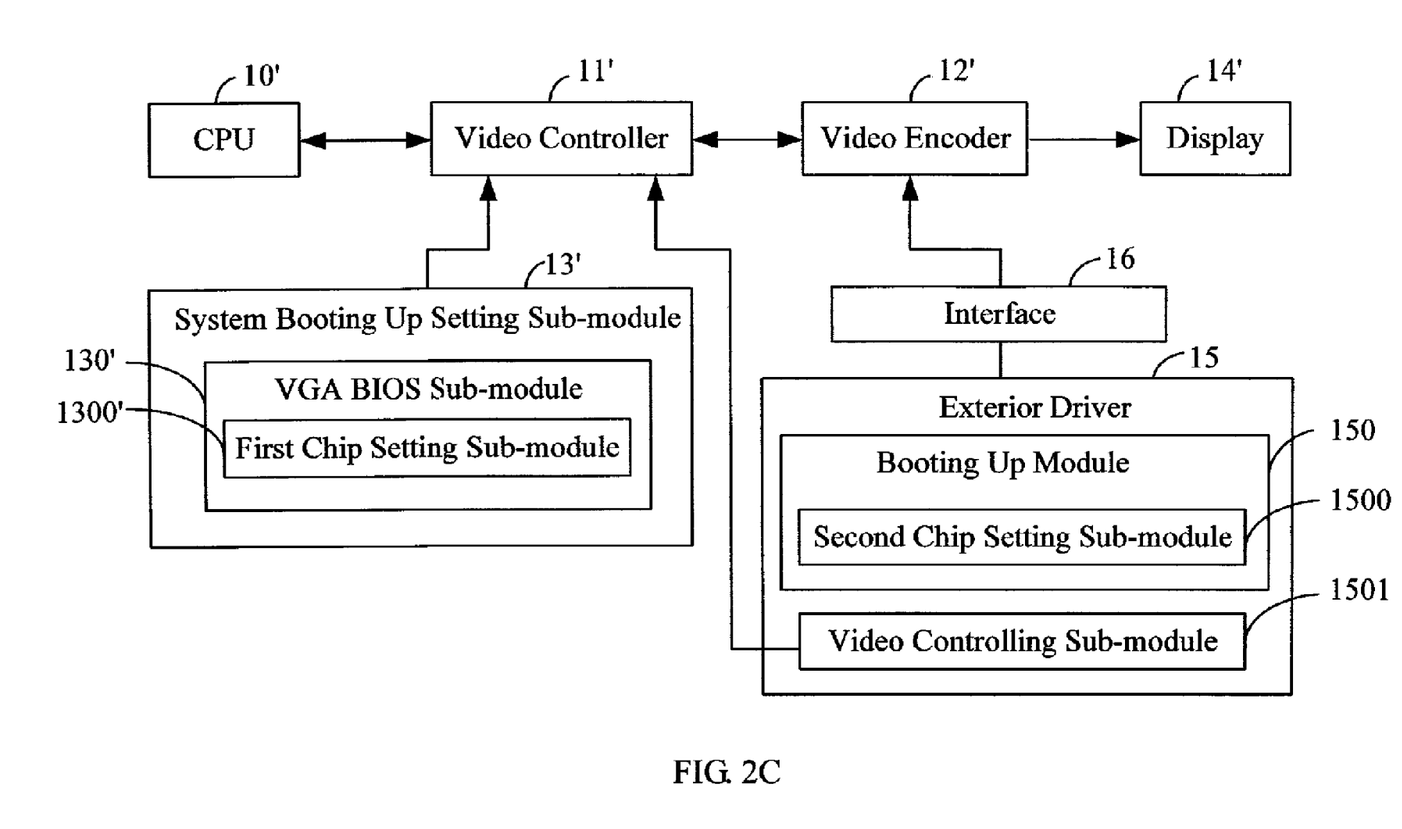
FIG. 2C is a block diagram of an embedded system in accordance with a fifth exemplary embodiment of the present invention.

FIG. 2C is a block diagram of an embedded system in accordance with a fifth exemplary embodiment of the present invention. In this embodiment, the embedded system uses an X86 CPU and works in the exterior driver booting up mode. The embedded system of FIG. 2C is substantially the same as that of FIG. 2A, except that the second chip setting sub-module 1500 is configured in the booting up module 150, and the video controlling sub-module 1501 is configured outside of the booting up module 150. In alternative embodiments, the video controlling sub-module 1501 can be configured in the booting up module 150, and the second chip setting sub-module 1500 can be configured outside of the booting up module 150.

Figure 2D:
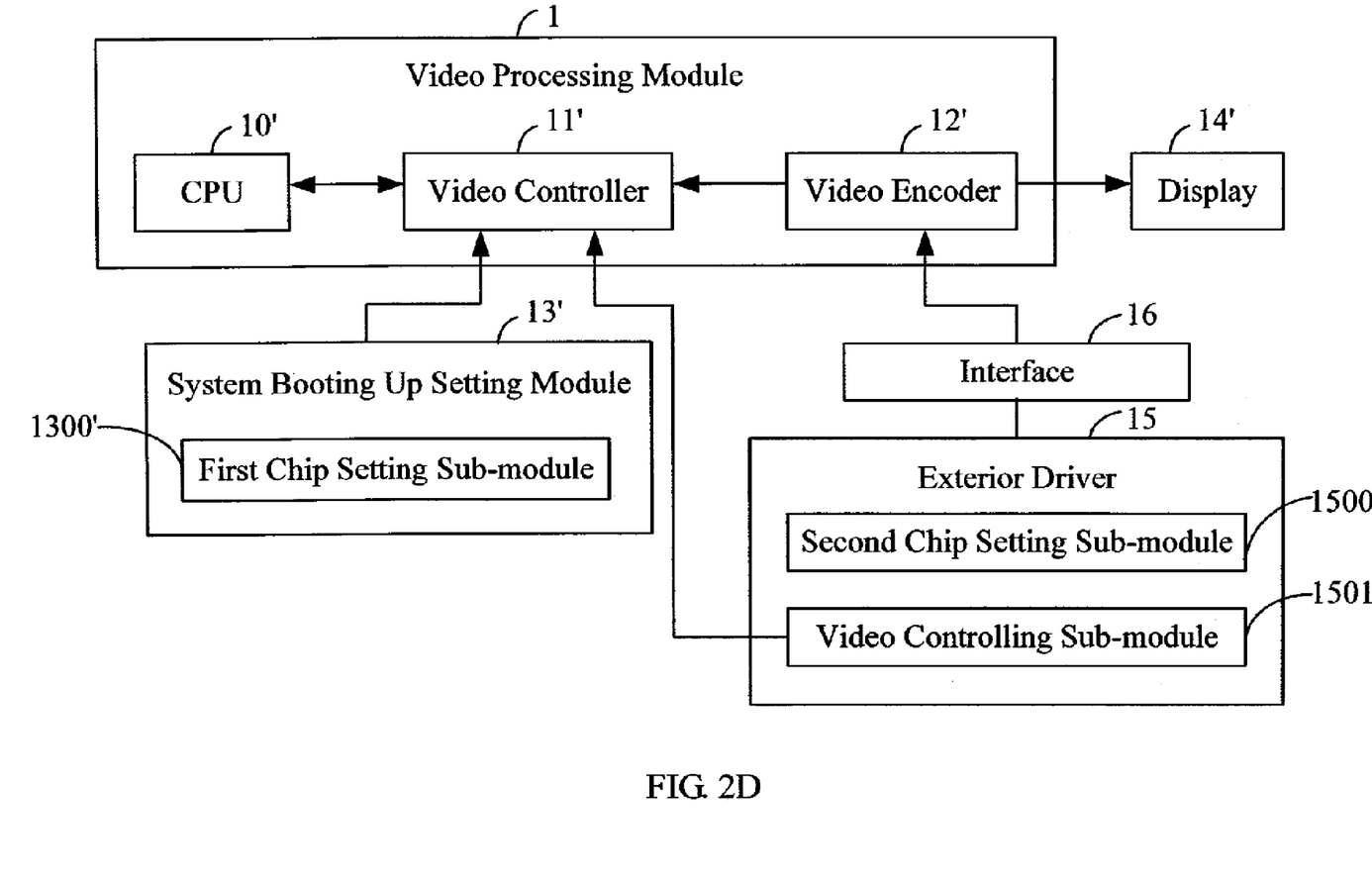
FIG. 2D is a block diagram of an embedded system in accordance with a sixth exemplary embodiment of the present invention.

FIG. 2D is a block diagram of an embedded system in accordance with a sixth exemplary embodiment of the present invention. In this embodiment, the embedded system uses an ARM or a MIPS CPU and works in the exterior driver booting up mode. The embedded system includes a video processing module 1, a system booting up setting module 13', a display 14', and an exterior driver 15. The video processing module 1 includes a CPU 10', a video controller 11', and a video encoder 12'. In this embodiment, the exterior driver 15 is connected to the video encoder 12' via an interface 16, and the interface 16 is a USB interface or an IDE interface. The system booting up setting module 13' is connected to the video controller 11' for booting up the embedded system, and includes a first chip setting sub-module 1300'. The exterior driver 15 includes a second chip setting sub-module 1500 and a video controlling sub-module 1501.

In this embodiment, the system booting up setting module 13' is the boot loader, and the video controller 11' only works in the second mode. When the embedded system is powered up, the system booting up setting module 13' receives a password, and determines whether the password is right. If the password is not right, the embedded system works in the normal booting up mode. If the password is right, the system booting up setting module 13' determines whether there is an exterior driver 15. If there is no exterior driver 15, the embedded system works in the normal booting up mode. If there is an exterior driver 15, the system booting up setting module 13' determines whether there is a second chip setting sub-module 1500 in the exterior driver 15. If there is a second chip setting sub-module 1500 in the exterior driver 15, the system booting up setting module 13' instructs the second chip setting sub-module 1500 to set a work mode of the video encoder 12'. Then the video encoder 12' informs the video controller 11' of the work mode of the video encoder 12', and thus the video controller 11' outputs signals that match the work mode of the video encoder 12'. Therefore, the display 14' shows debug images and the embedded system is booted up. If there is no second chip setting sub-module 1500, the display 14' does not show the debug images, and the embedded system cannot be booted up.

In this embodiment, the working frequency of the video controller 11' is set by the video controlling sub-module 1501. In alternative embodiments, the video controlling sub-module 1501 can be omitted, in which case the working frequency of the video controller 11' is set by the system booting up setting module 13'.

In the above-described first through sixth embodiments, only authorized operators using an exterior driver having a correct second chip setting sub-module 1500 can set the work mode of the video encoder 12' correctly, and thus enter the embedded system for maintenance. Therefore, the embedded system has reliable security.

In addition, in order that the contents of the second chip setting sub-module 1500 are not easily obtained by unauthorized operators, the work mode of the VGA BIOS sub-module 130' in the exterior driver booting up mode in FIGS. 2A, 2B, 2C or 2D is different from that of the VGA BIOS sub-module 130 in the normal booting up mode in FIG. 1A or FIG. 1B. Therefore, the display 14' shows the booting up images of the second display modes in the exterior driver booting up mode; that is, the display 14' shows 640×400×16 booting up images. In the exemplary embodiments, the booting up module 150 is a disk operating system (DOS).

Figure 3A:
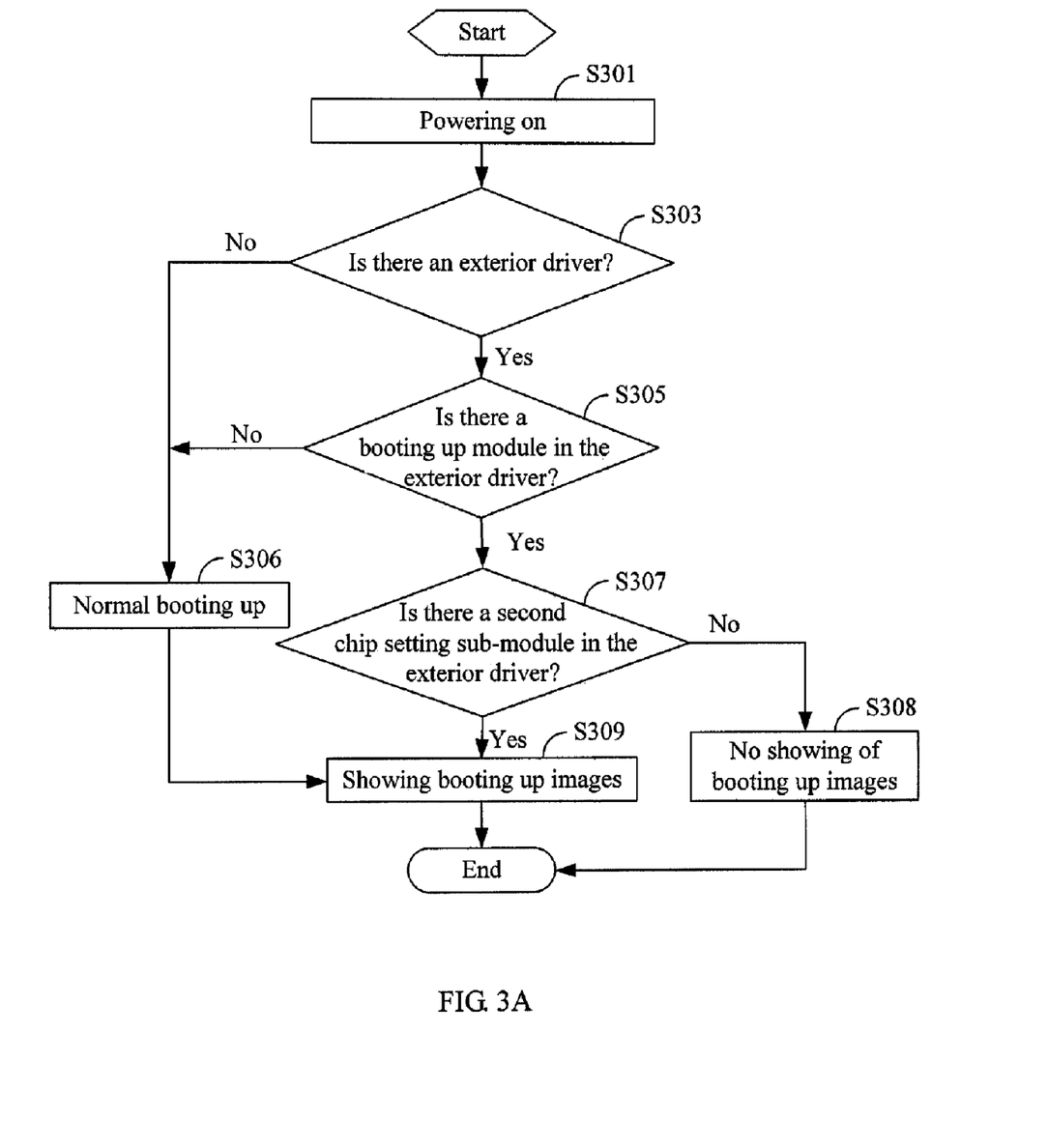
FIG. 3A is a flow chart of a method for booting up an embedded system in accordance with an exemplary embodiment of the present invention.

FIG. 3A is a flow chart of a method for booting up an embedded system in accordance with an exemplary embodiment of the present invention. In the exemplary embodiment, the embedded system uses an X86 CPU. The booting up mode of the embedded system includes an exterior driver booting up mode and a normal booting up mode, and the exterior driver booting up mode has priority. At step S301, the embedded system is powered up. At step S303, the system booting up setting module 13' detects whether there is an exterior driver 15. If there is no exterior driver 15, at step S306, the embedded system works in the normal booting up mode. Accordingly, at step S309, the display 14' shows 640×480×256 booting up images, and the embedded system is booted up.

If in step S303 there is an exterior driver 15, then at step S305, the system booting up setting module 13' determines whether there is a booting up module 150 in the exterior driver 15. If there is no booting up module 150, the procedure goes to steps S306 and S309 described above, in which the embedded system works in the normal booting up mode, the display 14' shows 640×480×256 booting up images, and the embedded system is booted up. If there is a booting up module 150, at step S307, the system booting up setting module 13' determines whether there is a second chip setting sub-module 1500 in the exterior driver 15. If there is no second chip setting sub-module 1500, at step S308, the display 14' does not show the booting up images, and the embedded system is not booted up. If there is a second chip setting sub-module 1500, at step S309, the display 14' shows 640×400×16 booting up images, and the embedded system is booted up.

Figure 3B:
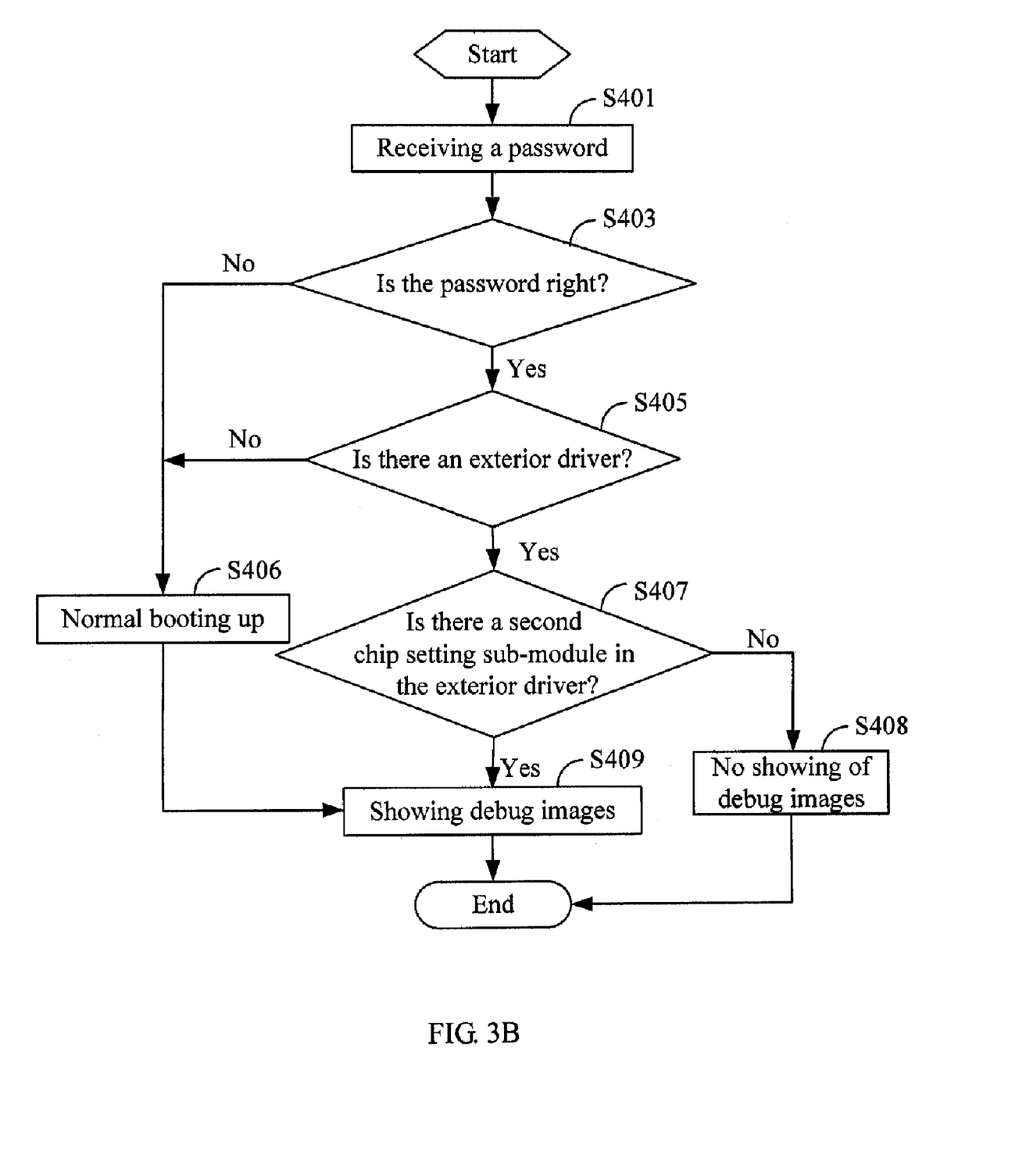
FIG. 3B is a flow chart of a method for booting up an embedded system in accordance with another exemplary embodiment of the present invention.

FIG. 3B is a flow chart of a method for booting up an embedded system in accordance with another exemplary embodiment of the present invention. The embedded system uses an ARM or a MIPS CPU. At step S401, the system booting up setting module 13' receives a password. At step S403, the system booting up setting module 13' determines whether the password is right. If the password is not right, at step S406, the embedded system works in the normal booting up mode. Accordingly, at step S409, the display 14' shows debug images, and the embedded system is booted up.

If in step S403 the password is right, then at step S405, the system booting up setting module 13' determines whether there is an exterior driver 15. If there is no exterior driver 15, the procedure goes to steps S406 and S409 described above, in which the embedded system works in the normal booting up mode, the display 14' shows debug images, and the embedded system is booted up. If there is an exterior driver 15, at step S407, the system booting up setting module 13' determines whether there is a second chip setting sub-module 1500 in the exterior driver 15. If there is a second chip setting sub-module 1500, at step S409, the display 14' shows debug images, and the embedded system is booted up. If there is no second chip setting sub-module 1500, at step S408, the display 14' does not show debug images, and the embedded system is not booted up.

While particular embodiments have been described above, it should be understood that they have been presented by way of example only and not by way of limitation. Thus the breadth and scope of the present invention should not be limited by the above-described exemplary embodiments, but should be defined only in accordance with the following claims and their equivalents.

What is claimed is:

1. A method for booting up an embedded system that can be booted up in a normal booting up mode or an exterior driver booting up mode, the embedded system comprises a video encoder and a video controller, the method comprising the steps of:
   powering on the embedded system;
   detecting whether there is an exterior driver;
   determining whether there is a booting up module in the exterior driver, if there is an exterior driver;
   determining whether there is a chip setting sub-module in the exterior driver, if there is a booting up module in the exterior driver; and
   showing booting up images, if there is a chip setting sub-module in the exterior driver;
   wherein the chip setting sub-module is used for setting a work mode of the video encoder to be the same as that of the video controller.

2. The method as recited in claim 1, further comprising the step of working in the normal booting up mode, if there is no exterior driver.

3. The method as recited in claim 1, further comprising the step of working in the normal booting up mode, if there is no booting up module in the exterior driver.

4. The method as recited in claim 1, further comprising the step of not showing booting up images, if there is no chip setting sub-module in the exterior driver.

5. A method for booting up an embedded system that can be booted up in a normal booting up mode or an exterior driver booting up mode, the embedded system comprises a video encoder and a video controller, the method comprising the steps of:
   receiving a password;
   determining whether the password is right;

determining whether there is an exterior driver, if the password is right;

determining whether there is a chip setting sub-module in the exterior driver, if there is an exterior driver; and showing debug images, if there is a chip setting sub-module in the exterior driver;

wherein the chip setting sub-module is used for setting a work mode of the video encoder to be the same as that of the video controller.

6. The method as recited in claim 5, further comprising the step of working in the normal booting up mode, if the password is incorrect.

7. The method as recited in claim 5, further comprising the step of working in the normal booting up mode, if there is no exterior driver.

8. The method as recited in claim 5, further comprising the step of not showing debug images, if there is no chip setting sub-module in the exterior driver.

9. An embedded system booted up in a normal booting up mode or an exterior driver booting up mode, comprising:
   a central processor unit (CPU);
   a video controller, connected to the CPU, for controlling the embedded system to show different mode images;
   a system booting up setting module, connected to the video controller, for driving the embedded system to boot up in the normal booting up mode;
   a video encoder, connected to the video controller, for converting digital signals received from the video controller to analog signals; and
   an exterior driver, connected to the video encoder, for driving the embedded system to boot up in the exterior driver booting up mode.

10. The embedded system as recited in claim 9, wherein the system booting up setting module is a basic input output system (BIOS).

11. The embedded system as recited in claim 10, wherein the system booting up setting module comprising a video graphics array (VGA) BIOS sub-module, for setting a work mode of the video controller.

12. The embedded system as recited in claim 11, wherein the VGA BIOS sub-module comprises a first chip setting sub-module, for setting a work mode of the video encoder when the embedded system works in the normal booting mode.

13. The embedded system as recited in claim 10, wherein the exterior driver comprises a booting up module, for driving the embedded system to boot up in the exterior driver booting up mode.

14. The embedded system as recited in claim 13, wherein the booting up module comprises a second chip setting sub-module, for setting a work mode of the video encoder when the embedded system works in the exterior driver booting up mode.

15. The embedded system as recited in claim 9, wherein the system booting up setting module is a boot loader.

16. The embedded system as recited in claim 15, wherein the system booting up setting sub-module comprises a first chip setting sub-module, for setting a work mode of the video encoder when the embedded system works in the normal booting up mode.

17. The embedded system as recited in claim 15, wherein the exterior driver comprises a second chip setting sub-module, for setting a work mode of the video encoder when the embedded system works in the exterior booting up mode.

18. The embedded system as recited in claim 15, wherein the exterior driver comprises a video controlling sub-module, for setting working frequency of the video controller.

\* \* \* \* \*